INVENTOR
Edward J. De Ville
BY
F. R. Walker
ATTORNEY.

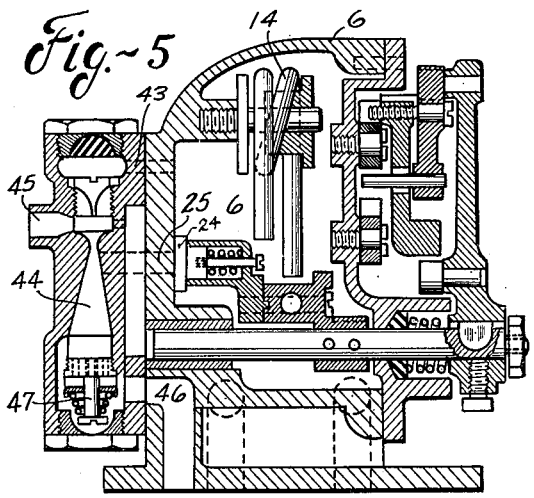
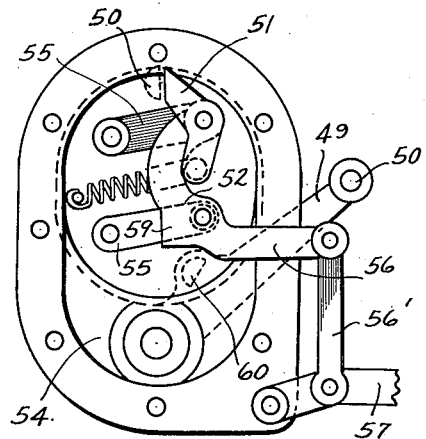
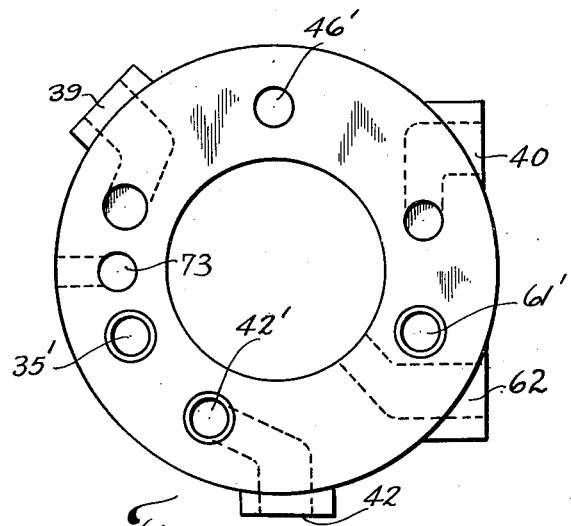
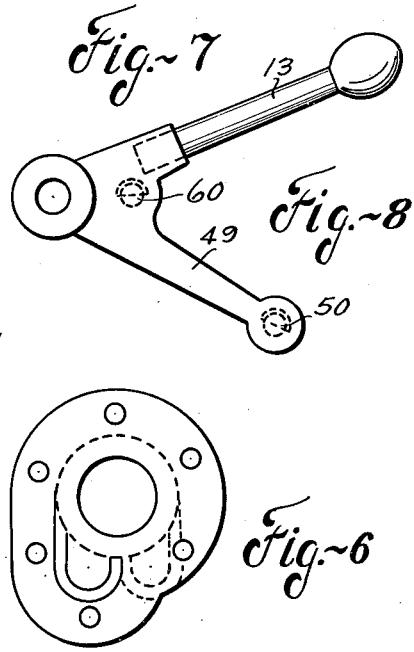
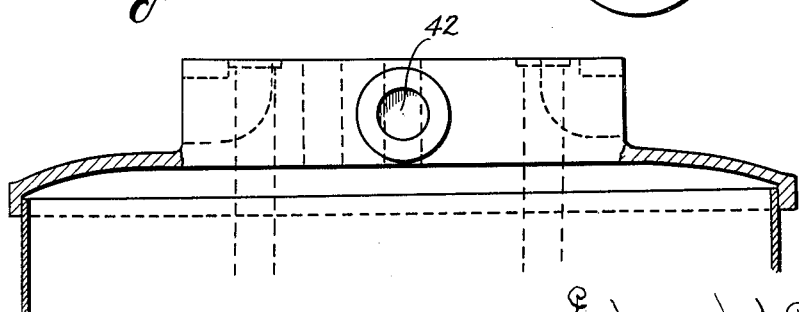

April 18, 1950 E. J. DE VILLE 2,504,816
WATER SOFTENER
Filed Nov. 6, 1944 4 Sheets-Sheet 4
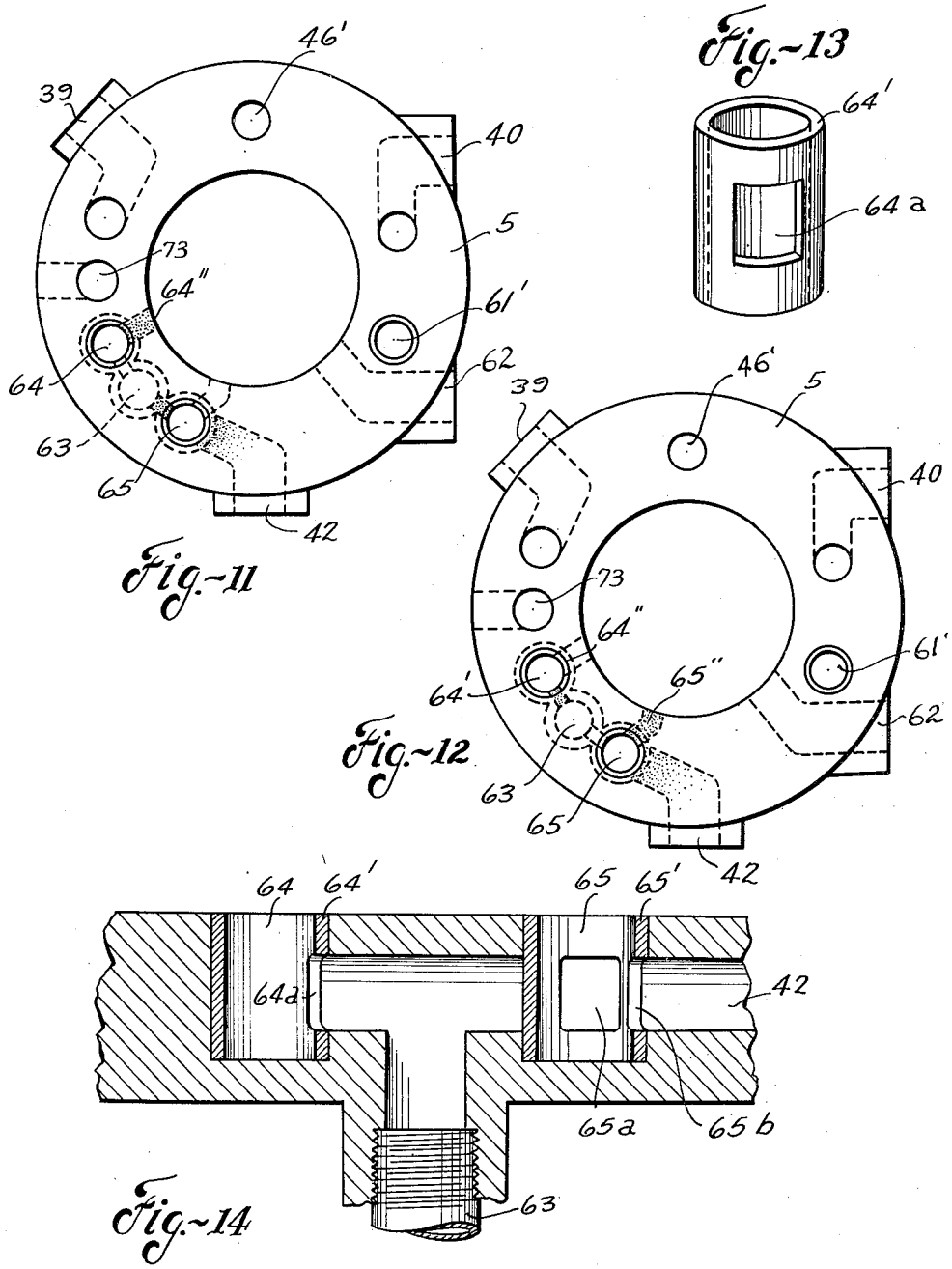

Patented Apr. 18, 1950

2,504,816

UNITED STATES PATENT OFFICE 2,504,816

WATER SOFTENER

Edward J. De Ville, Dayton, Ohio, assignor, by decree of distribution, to Helen De Ville and Clara Quartel Application November 6, 1944, Serial No. 562,122

19 Claims. (Cl. 210—24)

This invention pertains to water softening apparatus of the base exchange type, and more particularly to a semi-automatic apparatus wherein the cycle of regeneration having been manually initiated, will be automatically continued through successive stages until finally returned to the normal operating or service condition.

The object of the invention is to improve the construction as well as the means and mode of operation of a water softening apparatus, whereby it may not only be economically manufactured and operated, but will be more efficient in use, automatic in its operation after the cycle thereof has been initiated, uniform in its action, of compact form, having a minimum number of operative parts, and be unlikely to get out of repair.

A further object of the invention is to provide an improved synchronized valve mechanism for controlling the directions of flow of water and brine into and out of the softening tank in predetermined sequence.

A further object of the invention is to provide a manifold unit intermediate the softening tank and the valve mechanism with which the various supply and service and the regeneration conduits connect, and which enables removal of the valve mechanism for inspection or repairs without the necessity of disconnecting any of the supply, service or regeneration conduits.

A further object of the invention is to provide an arrangement wherein the water softening tank may be quickly and easily interchanged from up flow to down flow operation, and vice versa, without disconnection of any supply, service or regeneration conduits.

A further object of the invention is to provide a water softening apparatus having the advantageous structural features and the inherent meritorious characteristics and mode of operation hereinafter set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

Referring to the drawings, wherein is illustrated a preferred but obviously not necessarily the only form of embodiment of the invention, Fig. 1 is a side elevation of an assembled water softening apparatus embodying the present invention.

Fig. 5 is a transverse sectional view of the valve mechanism on line 5—5 of Fig. 2.

Fig. 6 is a transverse sectional view through the valve cylinder on line 6—6 of Fig. 2.

Fig. 7 is a detail front elevation of a float controlled trip mechanism.

Fig. 8 is a detail view of the operating handle by which the cycle of reconditioning is initiated.

Figs. 9 and 10 are respectively a top plan view and a side elevation of a manifold through which the valve mechanism is variously connected with the water supply and service system, and with the reconditioning brine tank, and in optionally variable relation with the main treatment tank.

Figs. 11 to 14 show a modified form of manifold in which the down pipe is permanently attached, Fig. 11 being a top plan view of a manifold showing the connections for "downflow" operation.

Fig. 12 is a top plan view of the modified manifold showing the connections for "upflow" operation.

Fig. 13 is a detail perspective view of one of the valves used in the manifold of Figs. 11 and 12.

Fig. 14 is an enlarged fragmentary detail sectional view of the manifold shown in Fig. 12.

Like parts are indicated by similar characters of reference throughout the several views.

Figure 1:
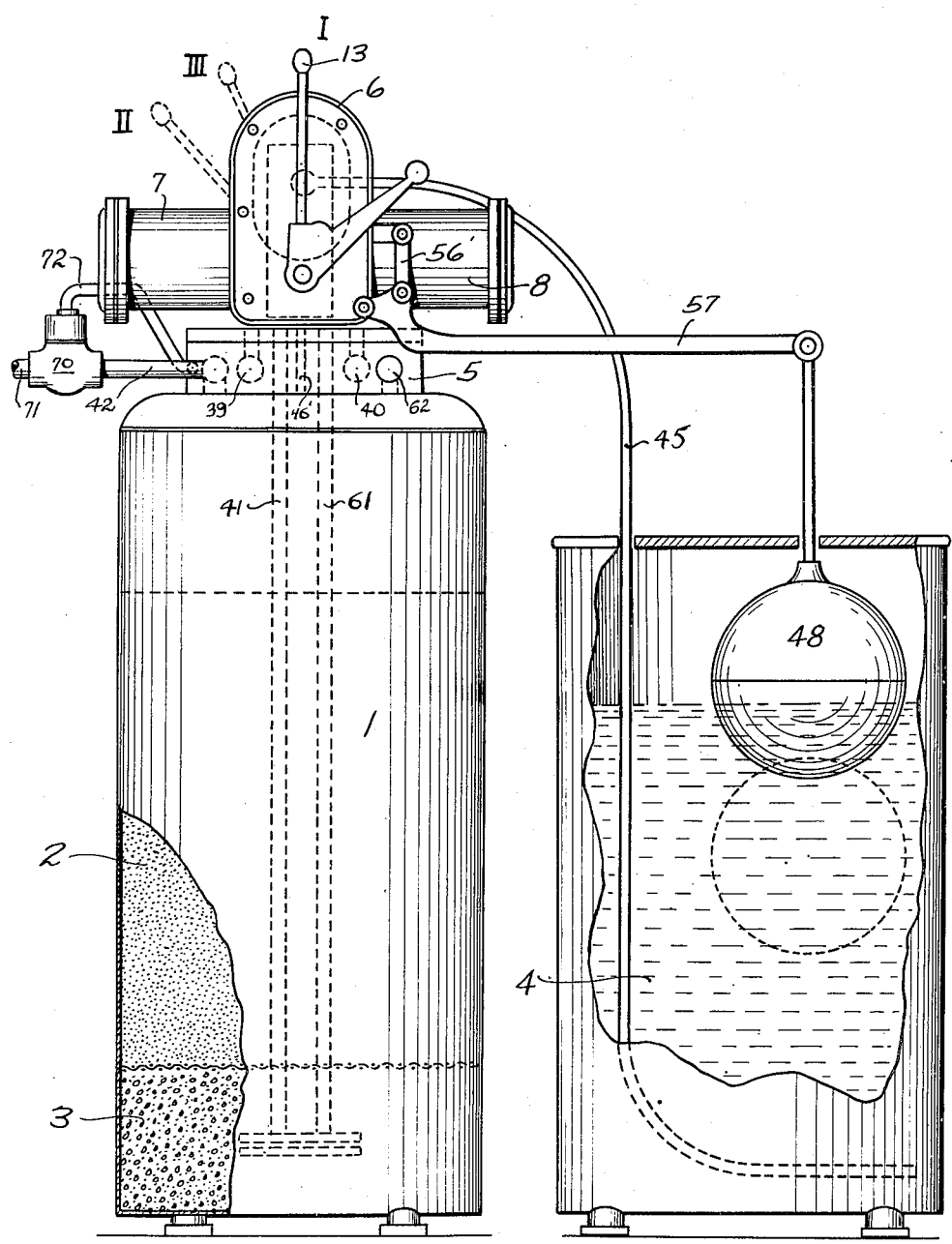

The present water softening apparatus is of that type wherein a hard water supply holding in solution more or less lime, or lime and magnesium, is admitted to a primary or softening tank 1, wherein it is filtered either downwardly or upwardly, known as "up flow" or "down flow" systems respectively, through a filter body 2 of green sand or double silicates known as zeolites, which have the peculiar characteristic of changing their bases. If they possess a calcium base when brought into contact with a potassium or salt solution, they give up their calcium to the solution and take the potassium therefrom as their base. When subsequently brought into contact with a solution containing calcium, or calcium and magnesium, they equally readily re-exchange their potassium base for the calcium. In the present instance the zeolite filter bed 2, which is superposed upon a bed 3 of inert gravel, is alternately subjected to infiltration of hard water containing lime which is precipitated or taken up by the zeolites, and to periodic infiltration of salt brine from a secondary or regeneration tank 4, for the potassium of which the previously acquired lime or calcium base is again exchanged. Thereafter the zeolite filter bed is thoroughly washed by circulation of water therethrough to remove any remaining salt brine and impurities which may have been deposited from the previous hard water supply.

The primary or softening tank 1 is provided at its top with a manifold collar 5 which may be integral with the head of the tank or may be a separate unit, to which the several supply, service and regeneration conduits are connected, and through which they communicate with the tank 1 and with the valve mechanism which is mounted on top of the manifold 5. The valve mechanism is contained in a housing comprising a domed medial chamber 6, from which extend opposed valve cylinders 7 and 8 containing duplex reciprocatory valve mechanism, which is actuated into alternate positions and an intermediate position in predetermined sequence.

Figure 2:
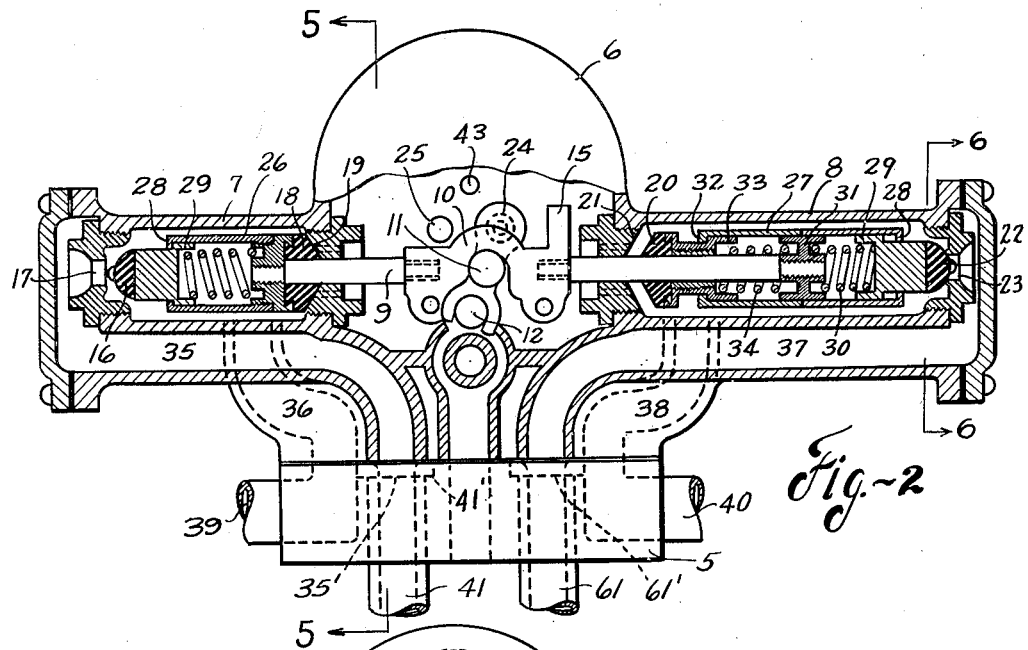
Fig. 2 is a longitudinal sectional view through the control valve mechanism while in normal operating or "service" condition, wherein the raw or hard water is being supplied to the chemical treatment bed, and the resulting softened water delivered for use.
Figure 3:
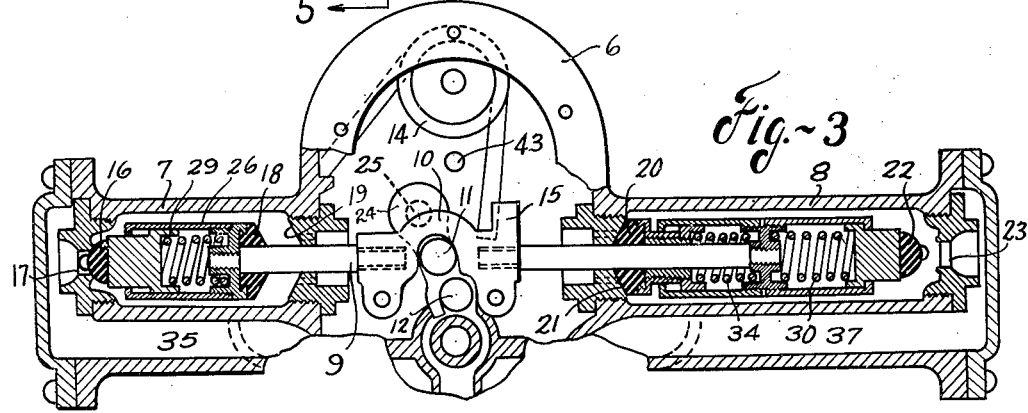
Fig. 3 is a similar view, partly broken away, illustrating the valve mechanism while in the "regeneration" or "brine supply" position, wherein salt brine is being supplied to the main tank for reconditioning the exhausted chemical treatment bed preparatory to treatment of a further hard water supply.
Figure 4:
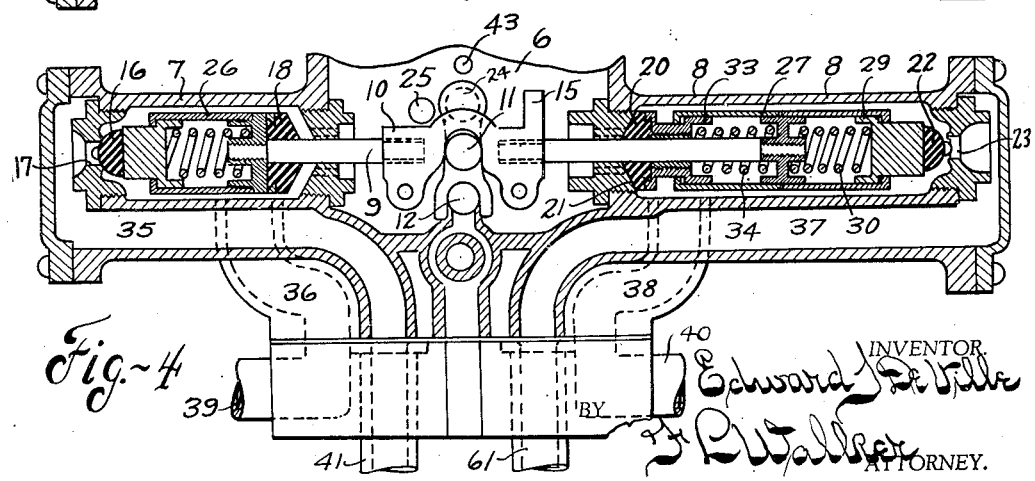
Fig. 4 is a like view, showing the valve mechanism in the "refill and rinse" or wash position, wherein the remains of the regeneration brine treatment are being eliminated, and the brine tank is being replenished by admission of water to form more salt brine preparatory to the next regeneration period.

Referring to Figs. 2, 3 and 4, which illustrate the valve mechanism in successive operative positions, to wit, "service," "regeneration" and "wash and refill," respectively, there are identical dual valve assemblies in each of the valve housing cylinders 7 and 8.

The respective pairs of valves are interconnected by a reciprocatory valve stem 9, having at its middle a cross head 10 engaged by a crank 11, carried by a main shaft 12, to which is connected a manually operable hand lever 13. The reciprocatory valve stem 9 is urged in one direction (toward the right in the drawings) by a coil spring 14 positioned in the dome of the medial chamber 6, one arm of which abuts upon the inner wall of the chamber 6, and the other arm of which exerts reactive thrust influence upon an upstanding lug 15 projecting from the cross head 10.

These valves are arranged in pairs, comprising a hard water inlet valve 16 cooperating with a valve seat 17, and a wash water supply valve 18 cooperating with a perforate valve seat 19 in the left hand valve cylinder 7. In the opposite valve cylinder 8 are a wash water drain valve 20 cooperating with a perforate valve seat 21 and a brine or regeneration valve 22 having a valve seat 23. In the medial reconditioning chamber 6 is a refill port valve 24 operative during the regeneration period to close a port 25 through which the brine tank 4 is otherwise refilled.

The valves 18 and 20 of each pair are provided with tubular bodies or barrels 26 and 27 internally flanged at 28 at their extremities. The valve bodies 16 and 22 are telescopically adjustable within the barrels 26 and 27. The valves 16 and 22 are provided with peripheral flanges 29, abutting upon the internal flanges 28 to limit independent outward reciprocation under the influence of springs 30 within the respective barrels 26 and 27 against the yielding resistance of which the valves of each pair are movable one relative to the other.

The barrel 27 in the housing cylinder 8 is of greater length than that of the opposite valve 18 in the cylinder 7, and is provided with a medial partition 31. The valve 20 is also telescopically mounted in the inner end of the barrel 27, which is internally flanged at 32 for abutting engagement with a peripheral flange 33 on the valve 20. The valve 20 and barrel 27 are yieldingly adjustable against the tension of a spring 34 enclosed within the barrel 27 at the inner side of the partition 31. The construction is such that upon movement of the valve stem 9 to close the valve 18 upon its seat 19, the internal flange 28 of the barrel 26 in the left hand cylinder 7 engages the peripheral flange 29 of the valve 16 to retract it from its seat 17 and open such valve. By the same movement of the valve stem 9, the barrel 27 in the right hand cylinder 8 is moved toward the right and forces the valve 22 against its seat 23 under tension of the enclosed spring 30 to close such valve. By the same movement the flange 32 on the inner end of the barrel 27 is caused to engage the peripheral flange 33 of the valve 20 to retract the valve 20 away from its seat 21 to open such valve.

The valve cylinders 7 and 8 have conduits 35 and 37 respectively connecting the heads of the valve cylinders and the valve seats 17 and 23 through the manifold 5 to the primary or softening tank 1. They each likewise have passages 36 and 38 respectively communicating with the cylinders intermediate the respective valves therein, and connecting the cylinders respectively with the hard water inlet 39 of the manifold 5 and the drain outlet 40 thereof.

Softening or service operation

Referring to Fig. 2, which shows the valves in their operating or "service" relations, the hard water entering through the inlet 39 of the manifold (see Fig. 9) passes upwardly through the registering passage 36 of the valve housing to the cylinder 7 and thence outwardly toward the head of the cylinder and past the open valve 16 and through the passage 35, which registers with a counterbored port 35' of the manifold and therethrough into the tank 1. If the apparatus is adapted for "up flow" operation, a pipe 41 having a terminal flange 41' is suspended in the counterbored port 35', which conducts the incoming hard water supply through the filter bed 2 to the bottom of the tank. From the bottom of the tank the water is permitted free flow upwardly through the zeolites to the space in the top of the tank 1 above the filter bed 2, from which it passes through the soft water port 42' and outlet 42 of the manifold 5 to the soft water service lines. If the apparatus is to be used as a "down flow" system, it is only necessary to transfer the flanged pipe 41 from the port 35' to the soft water port 42', which also is countersunk to receive the flanged end 41' of the pipe 41, which is merely suspended in the port and secured by the overlying portion of the valve housing. In such "down flow" operation the water entering the tank as before through the manifold port 35' enters the free space in the top of the tank and percolates downwardly through the filter bed 2 to the bottom of the tank, from which it returns through the pipe 41 which has been transferred from the port 35' to the outlet port 42.

During the softening or service operation period of the unit, valve 20 is held in open position thereby interconnecting chambers 6 and 7 of the control unit. The intermediate or third chamber 6 is consequently continually connected with the drain through the second chamber 8, and passage 38 to drain 40. Any seepage or leakage through valve 18 which might occur during the passage of water through chamber 7 is therefore continually drained from the control unit preventing unintentional creation of any pressure within the chamber 6.

*Regeneration operation*

When after a period of softening operation the filter bed 2 has changed to a calcium base and is no longer capable of attracting the calcium and magnesium content of the passing water, but is in an exhausted condition, it is revived by being subjected to circulation therethrough of salt brine to which it gives up its calcium base, and from which it acquires a potassium base. To set in operation the regeneration cycle, the hand lever 13 is manually moved through an arc of approximately forty-five degrees from the I position of Fig. 1 to the II position. Such movement of the lever 13 partially rotates the shaft 12 to oscillate the crank 11 to the position shown in Fig. 3, which shifts the cross head 10 and the valve stem 9 toward the left.

Such movement of the cross head and valve stem closes the valve 16 to shut off the hard water supply through the passage 35 to the tank, and simultaneously opens the valve 18 to admit hard water from the supply passage 36 to the medial chamber 6. A port 43 discharges hard water under pressure from the chamber 6 through a venturi 44, to which is connected a brine conduit 45 leading from the brine tank 4. There is thus created a suction influence upon the brine conduit 45, by which brine drawn from the tank 4 is intermixed with the water supply from the port 43 and discharged through the valved passage 46, having therein a check valve 47, and through the port 46' in the manifold 5 into the primary tank 1. While the operation of the hand lever 13 to initiate the regeneration period, as just described, is manual, the subsequent adjustment of the apparatus is automatically controlled by a timing trip device illustrated in Fig. 7 and controlled by a float 48 in the brine tank 4.

Connected with the hand lever 13 is an angularly extending arm 49, having at its extremity a laterally projecting stud 50. As the hand lever approaches the limit of its manual adjustment from position I to position II, Fig. 1, it passes over a spring actuated pawl 51 pivoted upon the upper end of a reciprocatory L-shaped bar 52. This trip device is contained within a separate chamber 54 at the front of the medial chamber 6 of the valve housing. The bar 52 is confined to a parallel movement up and down in accordance with the rise and fall of the float within the brine tank 4 by a pair of oscillatory links 55. The reciprocatory L-shaped member 52 includes an arm 56 connected by a link 56' with a float arm 57, from the extremity of which is suspended the float 48 which rises and falls with change of fluid level of the brine content of the tank 4. The rise and fall of the float 48 thus transmits unison movement of less degree to the L-shaped member 52. The stop lug 50 is engaged by the pawl 51 at the limit of manual movement of the hand lever to temporarily hold the latter and the reciprocatory valve stem 9 and connected valves in their operated condition (Fig. 3). In this position the valve 24 carried by the crank 11 overlies and closes the refill port 25 in the rear wall of the chamber 6.

While the parts continue to be held in such position by detent engagement of the pawl 51 with the stop lug 50 of the operating handle arm 49, brine from the regeneration tank 4 continues to be supplied to the filter bed within the softening tank 1 to revive the zeolites and recondition the filter bed by changing its chemical base from calcium to potassium characteristic. The regeneration period is determined by the time required for descent of the float 48 a predetermined distance within the tank 4. This in turn is determined by the time required to discharge a predetermined quantity of brine from such tank. During this regeneration period the brine being supplied to the tank 1 percolates through the filter body 2 to the bottom of the tank, and returns thence through a pipe 61 and port 61' of the manifold 5 to the passage 37 leading to the head end of the valve cylinder 8 and thence past the valve 22, which stands open under the described conditions, and through the valve cylinder to the passage 38 which is in communication with the drain or waste outlet 40 of the manifold 5.

As the brine supply is withdrawn from the tank 4 through the brine conduit 45 by the suction influence of the Venturi tube 44 and discharged thence through the passage 46 and manifold port 46' into the tank 1, the member 52 and with it the spring pawl 51 are drawn downwardly in unison with the descent of the float 48. Before the pawl is quite withdrawn from its engagement with the stop lug 50 at the extremity of the arm 49, a lower stop surface 59 of the member 52 is moved into the path of a second stop lug 60 adjacent the junction of the arm 49 and the handle lever 13. When the pawl 51 is finally disengaged from the stop 50 by descent of the member 52, the reaction of the coiled spring 14 in the chamber 6 automatically shifts the cross head 10 and valve stem 9 and associated valves from the regeneration or "brine" position of Fig. 3 to the "wash" and brine tank "refill" position of Fig. 4. The same movement under reaction of the spring 14 automatically moves the hand lever 13 from the II position of Fig. 1 to the III position thereof.

*Back wash and refill operation*

The several parts having been moved to the Fig. 4 position by the reaction of the spring 14 and arrested by the engagement of the stop lug 60 with the surface 59 of the member 52, the valve positions remain as before. The hard water supply valve 16 remains closed, as does also the valve 20, while the valves 18 and 22 remain open. The valve 24, however, carried by the crank 11 is shifted out of overlapping relation with the refill port 25, which also is now open.

Hard water entering through the inlet 39 flows through the passage 36 into the valve cylinder 7 and thence through the open valve 18 into the medial chamber 6. It continues to flow through the jet port 43 to the venturi and simultaneously through the refill port 25, which has been opened by the shift of the valve 24, to the venturi below its nozzle which destroys the suction thereof. The water supply may be directed from the refill port 25 directly into the brine conduit 45 with the same effect. The vacuum or suction of the Venturi tube having been destroyed, brine will no longer be withdrawn from the tank 4, and hard water supplied from the chamber 6 through the jet port 43 will be supplied through the valved passage 46 and port 46' in the manifold to the tank 1. The wash water thus supplied will follow the former course of the brine downwardly through the filter bed to the bottom of the tank, and thence upwardly through the pipe 61 and port 61' and the passage 37 to the head of the valve cylinder 8, and past the open valve 22 and valve cylinder to the passage 38 which communicates with the waste or drain outlet 40 of the manifold 5. This circulation of water will wash from the zeolite filter bed any remaining brine and impurities left by the previous hard water circulation. The wash period is determined by the rise of the float 48 within the brine tank as the supply of brine is replenished by water supplied from the chamber 6 to the tank 4 by reverse flow through the brine conduit 45. When the float 48 rises to its maximum position at the normal level of the brine contents of the tank, the member 52 is likewise raised sufficiently to raise the stop surface 59 thereon above the level of the stop lug 60 which is released thereby. Likewise, the pawl 51 is restored to the path of the stop lug 59. Upon release of the stop lug 60 the reaction of the coiled spring automatically moves to the cross head 10 and valve stem 9 and associated valves, and with them the hand lever 13 back to the normal or "service" position illustrated in Fig. 2. The revived apparatus is then in condition for a succeeding period of active water softening operation.

During the regeneration, wash and refill operation periods of the unit, discharge of water through the service line 42 is prevented by a check valve 70 (Fig. 1) which normally prevents back flow of softened water from the service line 71 into the softening apparatus. So long as the pressure on the discharge side 71 of the valve is equal to, or greater than the pressure within the tank 1, water will not flow from the tank to the line 71. During the regeneration, wash and refill cycles, additional pressure is applied to the check valve 70 through by-pass 72 to maintain the valve closed against the pressure within the tank 1. As previously explained, the regeneration, wash and refill operations are controlled by the flow of water through the intermediate chamber 6 in the control unit. There is a small by-pass passage in the control unit interconnecting the chamber 6 with the passage 73 in the manifold 5 to which the by-pass conduit 72 is connected. Thus during the reconditioning operations, water from the chamber 6 creates additional pressure on the check valve 70 to maintain it in closed position thereby preventing flow of brine or wash water through the service outlet 42 to the service line 71. During this period the valves in the control unit are so positioned that the brine and wash water pass from the tank 1 to the waste outlet 40 thereby preventing the creation of excessive pressure within the tank sufficient to overcome the resistance of the valve 70.

To enable wash of the filter bed for a longer period or more thoroughly than afforded by the automatic control apparatus, there is provided a supplemental drain outlet 62 from the tank to waste, which is not subject to control by the valved control unit, but would have a cut-off valve provided in the drain conduit therefrom (not shown). Water may be delivered to the tank through the inlet 39 and control unit passages to the pipe 41 and filtered upwardly through the filter bed for indefinite periods and discharged through the supplemental drain outlet 62 wholly independently of the operation of the described system.

The apparatus as before described is well adapted to optional "up flow" or "down flow" sequence of operation, which terms identify the course of the water through the filter bed 2. In up flow, the water is introduced into the tank through the pipe 41 to the bottom of the tank, from which it is permitted to filter upwardly through the bed of base exchange material, and the resulting soft water is withdrawn from the top of the tank through the service outlet 42. During down flow operation the course of the water through the filter bed is in reverse direction. The raw or hard water is introduced into the tank above the filter bed, from where it filters downwardly and the treated water is withdrawn from the bottom of the tank through the pipe 41 which has previously been transferred from the manifold port 35' to the port 42' communicating with the service outlet 42.

It is seldom necessary or desirable that the direction of filtration be changed after the apparatus has been installed. However, for economy of manufacture and to minimize the stock requirements of a dealer or supply house, it is quite desirable that a single model of apparatus be capable of being optionally converted from "up flow" to "down flow" operation, and vice versa, as conditions and circumstances might require.

In lieu of shifting the down pipe 41 to alternate positions from communication with manifold ports 35' to 42', and vice versa, there is illustrated in Figs. 11 to 14 a variation wherein is shown a permanently located down pipe 63 which may be alternately connected with a hard water inlet port 64 in the manifold registering with the control unit passage 35 and corresponding to the previously mentioned manifold port 35', and an outlet port 65 connected with the service outlet 42 and corresponding to the previously described manifold port 42'. The hard water inlet port 64 and outlet port 65 are each provided with a revolubly adjustable thimble valve or bushing 64' and 65' respectively. The bushing or thimble valve 64' is provided with a single lateral opening 64a through which the incoming hard water may be discharged either directly to the top of the tank through passage 64'' for filtration downwardly through the filter bed 2, or alternatively to the down pipe 63 through which the water supply may be delivered to the bottom of the tank for upward filtration through the filter bed 2.

The rotative bushing or thimble valve 65' is provided with two lateral openings 65a and 65b, through which the port 65 may be simultaneously connected with the down pipe 63 and the service outlet 42, to deliver softened water which has previously filtered downwardly through the filter bed 2 and then been withdrawn from the bottom of the tank through the pipe 63. By partial rotation of the valve or bushing 65', such port 65 may be simultaneously connected with the top of the tank through passage 65'' and with the service outlet 42, to deliver from the top of the filter bed treated water which previously was discharged through the down pipe 63 to the bottom of the tank and permitted to filter upwardly through the bed 2 of base exchange materials. Thus, by merely adjusting the bushings or thimble valves 64' and 65' to alternative positions, the apparatus can be readily converted from "up flow" to "down flow" operation, and vice versa.

It is to be noted that while the series of aligned valves are subject to operation by a common actuator, within a limited range the several valves are capable of differential movement one independently of another. The valve 18 is connected to and movable in unison with the reciprocatory valve stem 9 to a closed position during the service or softening period, as shown in Fig. 2, to a wide open position during the regeneration period, as illustrated in Fig. 3, and to an intermediate, but also an open, position while in the wash and refill position of Fig. 4. The hard water supply valve 16 is yieldingly connected with the reciprocatory valve stem, whereby it is held closed under the reactive tension of the coil spring 30 while the reciprocatory valve stem is adjusted to both the regeneration and wash and refill positions relative to the stationarily held hard water supply valve 16. However, when the valve stem is shifted to completely close the valve 18, as in the service position Fig. 2, the barrel 26, which is fixedly connected with the valve 18 and has sliding engagement with the valve 16, is coupled to the latter by the interengagement of the flange 28 of the barrel 26 with the flange 29 upon the valve to retract the valve to open the passage 17 as the valve 18 approaches its seat.

At the opposite side of the apparatus, both the valves 20 and 22 are yieldingly connected with the reciprocatory valve stem for differential adjustment. Both valves are subjected to spring pressure of individual springs by which they are urged toward their respective seats. The reciprocatory valve stem 9 is thus capable of limited independent motion in either direction, and as it approaches the limit of such movement it is engageable with one or the other of the valves 20 or 22 to retract such valves to open the corresponding passages. The coupling of the valve 22 with the reciprocatory valve stem is identical with that of the initial valve 16. That is, at the approach to the limit of its independent movement toward the left in Figs. 2, 3 and 4, the barrel flange 28 engages with the valve flange 29 to retract the latter, while in the opposite direction it is capable of limited independent movement against the tension of the corresponding spring 30 after the valve is closed. In the latter event the valve 20 is retracted from its seat by the interengagement of the barrel flange 32 with the valve flange 33, such retractive movement being independent of the brine valve 22, which remains closed, and against the tension of its spring 30. The series of valves are thus differentially subjected to the common actuator.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A water softening apparatus wherein a supply of hard water is filtered through a bed of base exchange materials followed by filtration of regeneration fluid therethrough and the regenerated filter bed washed preparatory to repetition of the cycle of operations, characterized by a valved control unit by which the sequence of the operative cycle is determined, including a plurality of passages leading to and from different parts of the filter bed, a reciprocatory valve stem in said unit, a series of valves controlling said passages to which the valve stem is common, operable in unison by movement of the valve stem, a hand lever for actuating the valve stem through a full range movement in one direction for initiating the cycle of operation, a retracting spring tensioned by operation of the hand lever for automatically returning the valve stem and associated valves through a step by step movement, a disengageable stop for arresting and subsequently releasing the valve stem and associated valves at the limit of their full range movement under influence of the hand lever, a second disengageable stop for arresting and subsequently releasing the valve stem and associated valves in a mid-range position of return movement under influence of the tensioned spring, a container for regenerating fluid from which fluid is drawn during the regenerating portion of the operating cycle, a float therein and stop operating mechanism operated by the float for disengaging the stops to release the valve stem and associated valves from successive positions in which they shall have been arrested, in accordance with fluctuations of the fluid level of the regenerating fluid supply.

2. A water softening apparatus wherein a supply of hard water is filtered through a bed of base exchange materials followed by filtration of regeneration fluid therethrough and the regenerated filter bed washed preparatory to repetition of the cycle of operations, characterized by a valved control unit by which the sequence of the operative cycle is determined, including a series of three intercommunicating chambers in said unit, hard water inlet and outlet passages to one of said chambers, a valve controlling intercommunication of said passages through said chamber, regenerating fluid inlet and outlet passages to a second of said chambers, a valve controlling the intercommunication of said passages through said second chamber, a third chamber with which the first and second chambers communicate, separate valves controlling the intercommunication of the third chamber with the first and second chamber, an outlet from said third chamber, a valve therefor, actuating means common to the series of valves, means for actuating the valves in unison through a full stroke movement in one direction and for returning the valves in unison through successive partial stroke movements to their initial positions, and stop means therefor governed by escape of water from said third chamber.

3. A water softening apparatus wherein a supply of hard water is filtered through a bed of base exchange materials followed by filtration of regeneration fluid therethrough and the regenerated filter bed washed preparatory to repetition of the cycle of operations, characterized by a valved control unit by which the sequence of the operative cycle is determined, including a chamber therein, an inlet conduit through which water under pressure is supplied thereto, a Venturi tube outlet therefrom, a supply tank for renegerating fluid connected with said Venturi tube outlet whereby regenerating fluid is drawn from said supply tank by the discharge of water under pressure from said chamber through said Venturi tube for filtration of the mixture thereof through the filter bed, a second outlet for water under pressure to said Venturi tube, the discharge through which destroys the suction of said Venturi tube and arrests the supply of regenerating fluid, a series of control valves in said control unit regulating the aforesaid cycle of operations, including a valve for said last mentioned discharge outlet from said chamber, and actuating means periodically operating the valves to control the sequence of said cycle of operation of the apparatus.

4. A water softening apparatus wherein a supply of hard water is filtered through a bed of base exchange materials followed by filtration of regeneration fluid therethrough and the regenerated filter bed washed preparatory to repetition of the cycle of operations, characterized by a valved control unit by which the sequence of the operative cycle is determined, including a series of three intercommunicating chambers in aligned relation within said unit, a series of passages therein leading to and from different parts of the filter bed, a series of valves controlling said passages and the intercommunication between the chambers, a reciprocatory valve stem common to said series of valves, means for adjusting the common valve stem to adjust the valves in unison into alternate operative positions, stop means for temporarily arresting the valve stem and associated valves in an intermediate position during their movement in one direction to regulate the sequential cycle of operation before mentioned, and automatic means for releasing the valve stem and valves for completion of their return to their initial positions.

5. A water softening apparatus having a softening tank wherein is contained a filter bed of base exchange materials through which hard water to be softened is filtered, characterized by a valved control unit directing fluid flow through said filter bed in a cycle of softening, regeneration and washing operations, including a manifold, sundry connections therethrough from the valved control unit to the tank and from the tank to the exterior thereof, including two valved passages therein, both of which communicate with the tank, and one of which communicates with the control unit to receive hard water therethrough to be softened and the other communicates with the exterior of the apparatus to discharge softened water therethrough, a down pipe extending from the top of the tank into proximate relation with the bottom of the filter bed common to said two valved passages, and valve means for alternately connecting the respective valved passages with the tank and with said down pipe, the construction and arrangement being such that the hard water passage may be made to discharge directly to the top of the tank and filter bed therein and the common pipe be made to collect softened water from a lower region of the filter bed and discharge it through the other valved connection to the exterior of the apparatus, or said hard water passage optionally connected directly to the pipe for discharge of the hard water supply therethrough to proximate relation with the bottom of the filter bed, and the other of said valved passages connected with the top of the tank and filter bed for discharge of softened water therefrom to the exterior of the apparatus.

6. A water softening apparatus of the type wherein a supply of hard water is filtered through a treatment tank having a bed of base exchange material therein followed by filtration of a regenerative fluid from a container therefor through the filter bed and the regenerated filter bed subsequently washed, characterized by a control unit associated with the treatment tank, a series of adjustable valves therein controlling the flow of hard water supply, the regulation of regenerative fluid and the circulation of wash water relative to the filter bed and operable in unison into extreme operative positions and intermediate operative positions, manual actuating means for moving the common operator to adjust the valves from one extreme position to the other, an actuating spring tending to automatically return the valves to their original positions, detent means for temporarily retaining the valves in the positions to which they were manually adjusted, a stop for arresting the valves in their intermediate positions, a float in the regenerating fluid container, a float controlled mechanism for automatically disengaging said detent to release the valves from their operated positions preparatory to their arrest in said intermediate positions by said stop and for subsequently disengaging the stop to release said valves from their intermediate positions for return to their original positions in completion of said cycle of operation, in accordance with change of fluid level of the regenerating fluid supply.

7. A water softening apparatus of the type wherein a supply of hard water is filtered through a treatment tank having a bed of base exchange material therein followed by filtration of a regenerative fluid from a container therefor through the filter bed and the regenerated filter bed subsequently washed, characterized by a control unit associated with the treatment tank, a hard water supply passage, a regenerating fluid supply passage and wash water passage in said unit communicating with the treatment tank, a series of control valves in aligned relation controlling said passages, a reciprocatory valve stem common to a plurality of said valves, manual means for shifting the common valve stem and associated valves in one direction to close the hard water supply valve and open the regenerating fluid valve, spring means tensioned by the manual adjustment of the valve stem for returning the reciprocatory valve stem and restoring the valves to their original positions, a detent for temporarily maintaining the common valve stem in position to maintain the hard water control valve closed and regenerating fluid valve open, a float in the regenerating fluid container operative to release said valve mechanism upon predetermined change of level of the regenerating fluid supply, a stop arresting the valve control mechanism in an intermediate position wherein the supply of regenerating fluid is arrested and a wash water supply substituted therefor.

8. A water softening apparatus of the type wherein a supply of hard water is filtered through a treatment tank having a bed of base exchange material therein followed by filtration of a regenerating fluid therethrough and the regenerated filter bed washed preparatory to readmission of hard water thereto, characterized by a manifold on top of the tank through which all exterior connections are made to the apparatus, a valve unit mounted on the manifold, inlet and outlet passages in the manifold communicating with the tank at the top and at the bottom of the filter bed therein, and communicating with the valve unit mounted thereon, a series of valves in said valve unit controlling the flow of hard water and resulting softened water, regeneration solution and wash water through the passages in said manifold into and out of the tank, means for periodically actuating the valves to initiate different periods in the cycle of operation, a supply tank for regenerating fluid, a float therein, arresting and release means for the control valves, and means for governing the actuation of the valves by the rise and fall of the float in the regenerating liquid tank the construction and arrangement being such that the valve unit may be bodily removed from the manifold without disturbing the exterior connections to the apparatus.

9. A water softening apparatus of the type wherein a supply of hard water is filtered through a treatment tank having a bed of base exchange material therein followed by filtration of regenerating fluid therethrough and the regenerated filter bed washed, characterized by a control unit, a manifold unit interposed between the tank and the control unit, inlet and outlet ports in the manifold communicating with the tank and control unit and by-pass ports interconnecting said tank and control unit, a series of valves in the control unit controlling the flow of hard water, regenerating fluid and wash water in a predetermined sequential cycle of operation, and actuating means therefor, the construction and arrangement being such that all external supply, discharge and drainage connections to the tank and control unit are made through said intermediate manifold independently of direct connection with the tank and control unit.

10. A water softening apparatus wherein a supply of hard water is filtered through a bed of base exchange materials followed by filtration of regeneration fluid therethrough and the regenerated filter bed washed preparatory to repetition of the cycle of operations characterized by a valved control unit by which the sequence of the operative cycle is determined, including a series of control valves therein adjustable in unison into alternate extreme positions and an intermediate position, manual means for adjusting the valves from one extreme position to the other, an actuating spring tensioned by the manual adjustment of the valves for returning the valves to their original positions, stop means for arresting the return of the valves in said intermediate position, and float operated means controlled by change of level of the supply of regenerating fluid in response to valve adjustments for initially releasing the valves for unison movement from their operated positions and subsequently to their intermediate positions, releasing the arrested valves for completion of their return to their normal position under influence of said actuating spring.

11. A water softening apparatus, wherein a supply of hard water is filtered through a treatment tank having a bed of base exchange material therein, followed by filtration of regenerating fluid therethrough and the regenerated filter bed washed preparatory to repetition of the cycle of operations, characterized by a valved control unit supported upon the tank controlling the flow of hard water supply, regenerating fluid and wash water relative to the filter bed, a manifold unit interposed between the valved control unit and the treatment tank, a hard water supply conduit, a soft water service conduit and a drain conduit for brine and wash water connected thereto, and passages therethrough connecting the hard water supply conduit with the control unit and thence with the tank, connecting the soft water service conduit with the tank, and conveying regenerating fluid and wash water from the control unit to the tank, the construction and arrangement being such that all external connections of the apparatus are affected through the manifold unit independently of connections directly with the control unit or tank.

12. A water softening aparatus wherein a hard water supply is filtered through a treatment tank having a bed of base exchange materials therein followed by filtration of regenerating fluid therethrough and the regenerated filter bed washed preparatory to repetition of the cycle of operation, characterized by a control unit, valved passages therein directing the hard water supply, the regeneration fluid and wash water relative to the filter bed, adjustable control valves for said passages, actuating means for adjusting the valves in unison into successive positions, detent means for temporarily arresting the valves in their filter regenerating positions, and thereafter releasing the valves for actuation into their filter wash positions upon lowering of the fluid level of the regenerating fluid supply, said detent means being subsequently operative to release the arrested valves from said filter wash positions for actuation to their service positions upon subsequent elevation of the fluid level of the regenerating fluid supply, and a float responsive to fluctuations of the fluid level of the regenerating fluid supply governing the detent.

13. A water softening apparatus wherein a hard water supply is filtered through a treatment tank having a bed of base exchange materials therein followed by filtration of regenerating fluid therethrough and the regenerated filter bed washed preparatory to repetition of the cycle of operation, characterized by a control unit, valved passages therein directing the hard water supply, the regeneration fluid and wash water relative to the filter bed, a series of movable valves therein controlling such flow, manual actuating means for shifting the valves from service positions to filter regenerative position, a retracting spring for automatically returning said valves to service positions, detent means for initially arresting the valves in their filter regenerating position and subsequently arresting them in their filter wash and regenerating fluid regenerating positions, and valve release means automatically effective upon discharge of regenerating fluid through said bed for releasing the valves from their filter regenerating position for actuation thence into their filter wash and regenerating fluid replenishing position under influence of said tensioned spring, said valve release means being further effective upon replenishment of the regenerating fluid supply to release the valves from their last mentioned position for completion of their return to their service position.

14. A water softening apparatus wherein a hard water supply is filtered through a treatment tank having a bed of base exchange materials therein followed by filtration of regenerating fluid therethrough and the regenerated filter bed washed preparatory to repetition of the cycle of operation, characterized by a control unit, valved passages therein directing the hard water supply, the regeneration fluid and wash water relative to the filter bed, adjustable control valves for said passages, actuating means for adjusting the valves into successive positions, a series of substantially aligned valves therein controlling such flow, a reciprocatory valve stem common to the series of valves, a manually operable lever for actuating the valve stem and series of associated valves in unison on one direction, a retracting spring tensioned by the manual actuation of the common valve stem and series of associated valves for returning said valves and common valve stem to their initial positions, and governing means for restricting said return movement to a step by step movement responsive to fluctuations of the fluid level of the regenerating fluid supply.

15. A water softening apparatus wherein a hard water supply is filtered through a treatment tank having a bed of base exchange materials therein followed by filtration of regenerating fluid therethrough and the regenerated filter bed washed preparatory to repetition of the cycle of operation, characterized by a control unit, valved passages therein directing the hard water supply, the regeneration fluid and wash water relative to the filter bed, a series of valves therein controlling such flow, a container for a supply of regenerating fluid, a Venturi tube for a supply of water under pressure discharging to said filter bed, a conduit for regenerating fluid leading from said container to said Venturi tube through which a flow of regenerating fluid is induced by action of the discharge of water under pressure for mixture therewith, an auxiliary discharge opening for water under pressure to said Venturi tube, controlled by one of the aforementioned series of valves and effective to destroy the suction influence thereof and arrest the induced flow of regenerating fluid therethrough to the filter bed, and common actuating means for simultaneously adjusting said series of valves through step by step movements into successive positions in predetermined sequence including the valve for the auxiliary water discharge opening.

16. In a water softening apparatus wherein a hard water supply is filtered through a treatment tank having a bed of base exchange material therein, followed by filtration of regenerating fluid therethrough and the regenerated filter bed washed, and the supply of regenerating fluid replenished, a control unit periodically directing water and regenerating fluid through the filter bed, a series of valves therein controlling such flow, actuating means for the valves, detent means for arresting the valves in successive positions of adjustment, float operated means for releasing the arrested valves for successive movements in accordance with fluctuations of the fluid level of a supply of regenerating fluid, effective to release the valves from one position of arrest upon the descent of the float as the regenerating fluid supply is depleted, and for releasing the valves from another position of arrest upon rise of the float as the supply of regenerating fluid is replenished.

17. A water softening apparatus wherein a hard water supply is conducted through a treatment tank having a filter bed of base exchange material therein, followed by a supply of regenerating fluid and the filter bed subsequently washed by circulation of more water therethrough preparatory to repetition of the cycle, characterized by a valved control unit supported on the tank and detachable therefrom for directing water and regenerating fluid through the filter bed in sequential cycle, a manifold unit interposed between the tank and valved control unit, exterior supply delivery and waste pipes connected to said manifold wholly independently of direct connection with the valved control unit and tank, the construction and arrangement being such that the valved control unit may be bodily removed from the assembly without disturbing the external supply, delivery and waste pipe connections.

18. A water softening apparatus wherein a hard water supply is filtered through a bed of base exchange material followed by filtration of regenerating fluid therethrough and the filter bed finally washed preparatory to repetition of the cycle, characterized by a control unit controlling the flow of water and regenerating fluid relative to the filter bed, including a reciprocatory valve stem common to a plurality of valves, actuating means therefor, a valve fixedly attached to the reciprocatory stem for unison movement toward and from its seat, a second valve relative to which the valve stem is capable of limited reciprocatory movement, a coupling device for automatically interengaging the second valve and stem for further movement in unison, and a spring urging the second valve to its seat when uncoupled from the reciprocatory stem.

19. A water softening apparatus wherein a hard water supply is filtered through a bed of base exchange material followed by filtration of regenerating fluid therethrough and the filter bed finally washed preparatory to repetition of the cycle, characterized by a control unit controlling the flow of water and regenerating fluid relative to the filter bed, including a reciprocatory valve stem common to a plurality of valves, actuating means for said valve stem, a pair of valves relative to which the stem is capable of independent movement, a coupling device for interengaging the reciprocatory stem alternately with the respective valves upon reversal of the direction of movement of the stem, tension springs separately urging the valves toward their seats when disengaged from the stem, the construction and arrangement being such that the movement of the stem in one direction to retract one of the valves from its seat, releases the other valve for movement toward its seat under influence of its spring, and vice versa.

EDWARD J. DE VILLE.

REFERENCES CITED

The following references are of record in the file of this patent:

UNITED STATES PATENTS

| Number | Name | Date |
|---|---|---|
| 616,197 | Moller | Dec. 20, 1898 |
| 1,144,758 | Desmond | June 29, 1915 |
| 1,271,805 | Thurber et al. | July 19, 1918 |
| 1,452,288 | Caps | Apr. 17, 1923 |
| 1,632,610 | Lindsay | June 14, 1927 |
| 1,866,890 | Horvath | July 12, 1932 |
| 1,897,432 | Klotzman | Feb. 14, 1933 |
| 1,913,238 | Johnson | June 6, 1933 |
| 1,935,458 | Pick | Nov. 14, 1933 |
| 1,937,325 | Pick | Nov. 28, 1933 |
| 1,976,906 | Waldron | Oct. 16, 1934 |
| 2,052,515 | Pick | Aug. 25, 1936 |
| 2,061,797 | Eisenhauer | Nov. 24, 1936 |
| 2,067,808 | Zimmerman et al. | Jan. 12, 1937 |
| 2,146,983 | Pick | Feb. 14, 1939 |
| 2,188,487 | Sharp | Jan. 30, 1940 |
| 2,309,032 | Zimmerman | Jan. 19, 1943 |
| 2,347,201 | Lindsay | Apr. 25, 1944 |
| 2,372,640 | Adler | Apr. 3, 1945 |
| 2,407,538 | Daniels | Sept. 10, 1946 |